June 8, 1943.     H. R. DAVIS     2,321,015
CATALYTIC REACTOR
Filed May 30, 1942     2 Sheets-Sheet 1
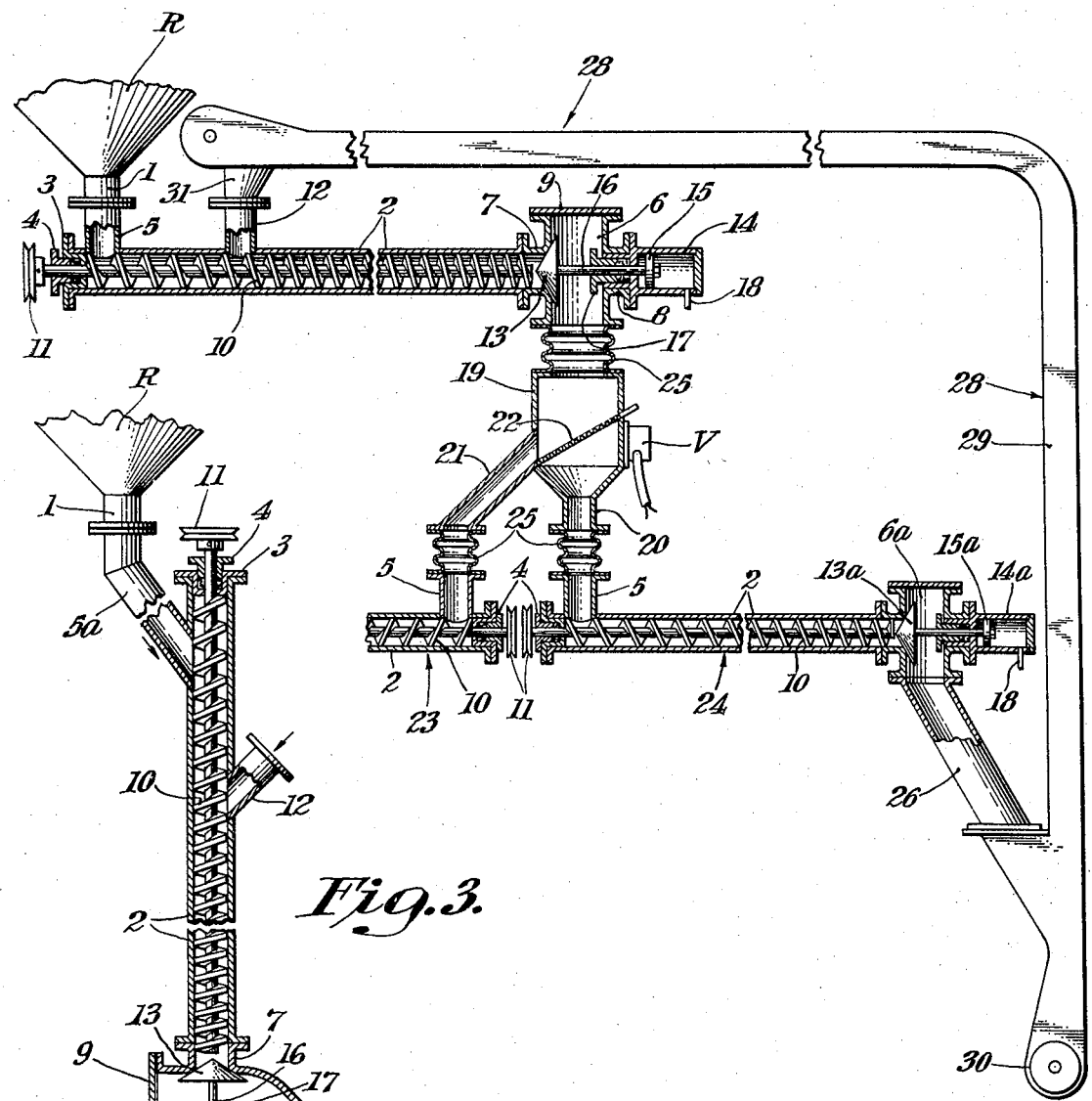

June 8, 1943. H. R. DAVIS 2,321,015
CATALYTIC REACTOR
Filed May 30, 1942 2 Sheets-Sheet 2
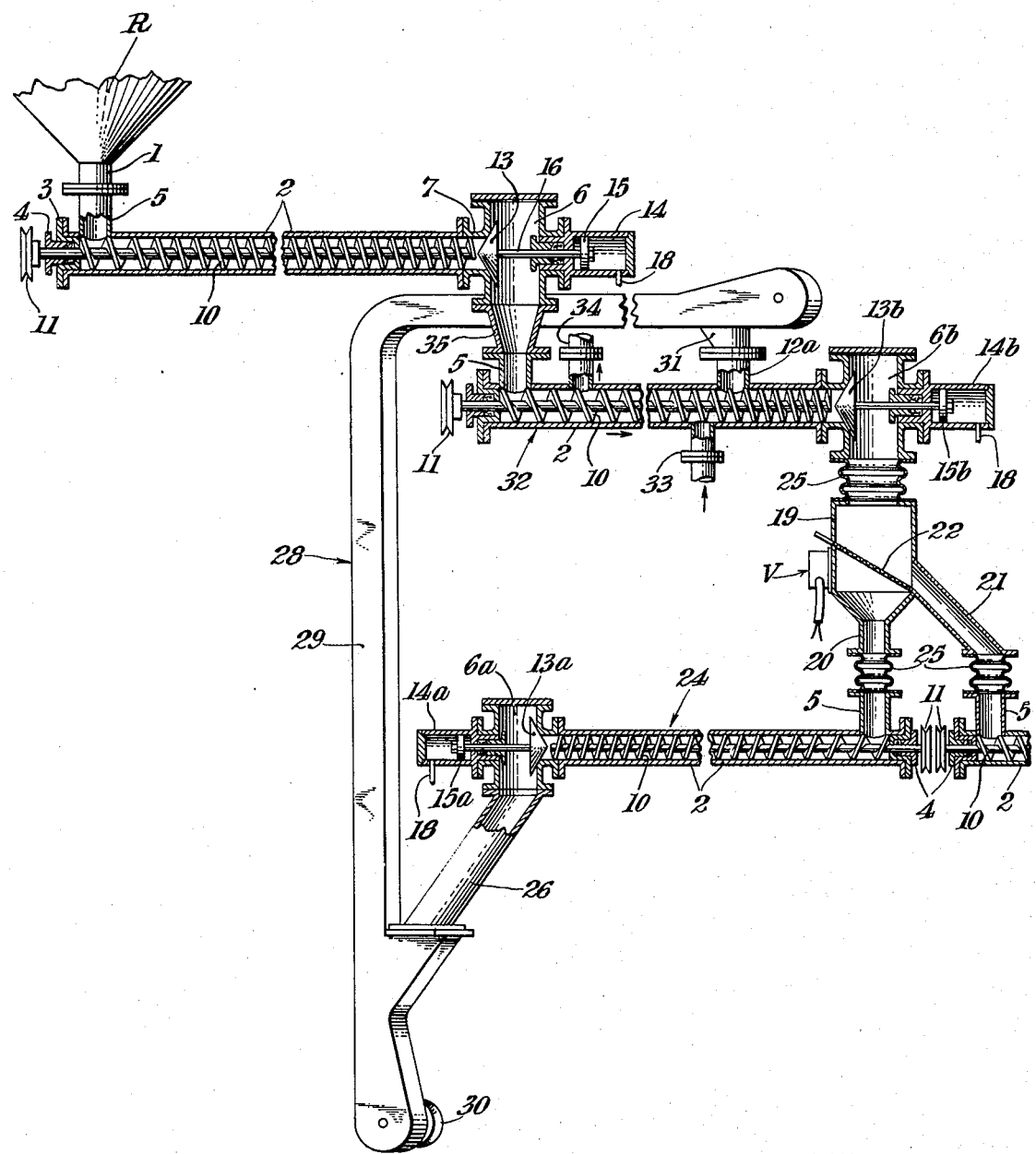
INVENTOR
Hyman R. Davis
BY Nathaniel Ely
ATTORNEY Patented June 8, 1943

2,321,015

UNITED STATES PATENT OFFICE 2,321,015

CATALYTIC REACTOR

Hyman R. Davis, New York, N. Y., assignor to The Lummus Company, New York, N. Y., a corporation of Delaware Application May 30, 1942, Serial No. 445,157

20 Claims. (Cl. 34—19)

This invention relates to the carrying out of chemical reactions in the presence of a suitable catalyst. It particularly relates to an improved method of and an apparatus for sealing the point of discharge of the catalyst from a catalytic reaction chamber.

Certain chemical processes are desirably conducted in the presence of a catalyst or require a catalyst to effect the reaction as, for example, certain hydrocarbon conversion processes. In most cases such processes are also conducted at a pressure other than atmospheric, which may be either superatmospheric or subatmospheric. The catalyst for such a process sooner or later becomes spent or unfit for its purpose because of the deposition thereon of contaminating materials and is then desirably reactivated to provide economic operation.

It has been proposed to conduct such catalytic reactions by moving the catalyst in a continuous stream through the reactor and out to an external reactivation zone and then back to the reactor. In such mode of operation, it is important that the reactor be sealed against loss or escape of the pressure at the point of removal of the catalyst therefrom so that both the reaction and the flow of the catalyst can be carried out continuously. The catalyst employed in such processes is often desirably in a coarse, granular form having a large contact surface in order to facilitate the reaction.

Important objects of my invention are to provide an improved method of sealing such a continuous catalytic reactor against loss of pressure at the point of withdrawal of the catalyst continuously moving therethrough and to provide a satisfactory apparatus for carrying out such method.

Other objects of my invention will appear hereinafter.

In the drawings,

Fig. 1 is a vertical longitudinal sectional view of one form of my improved sealing apparatus, with parts broken away, a portion of a catalytic reactor being shown in delivery connection with such apparatus;

Fig. 2 is a view similar to Fig. 1 and illustrates a modified form of the sealing apparatus;

Fig. 3 is a vertical sectional view with parts broken away of a further modification of the apparatus shown in Fig. 1.

According to my improved method of removing the catalyst, the continuous stream of spent granular catalytic material leaving the catalytic reactor is conducted into a gas-tight discharge conduit and propelled therealong to the conduit outlet. Before the catalyst reaches the outlet, there is admixed with it a solid filler material in a powdered form. This filler material may be the same as the catalyst but is preferably much more finely divided so that it will fill the spaces between the catalyst granules. Within the conduit these materials are thoroughly mixed, and the mixture is continuously propelled toward the conduit outlet. Before the mixture is discharged through such outlet, it is rendered sufficiently compact and dense so that it will seal the outlet and prevent loss of pressure therethrough. This result is effected by choking the outlet in a suitable manner so that the force propelling the mixture along the conduit will compact it against the choking mechanism. After discharge through the conduit outlet, the mixture is screened to separate the catalyst and the filler material. The latter is then conducted back to the discharge conduit for reuse, and the granular catalyst is conducted away for reactivation.

In the method as just outlined, it has been assumed that the chemical reaction is taking place in the vapor phase. If such reaction is occurring in the liquid phase, however, the catalyst is preferably dried before the filler material is admixed with it. This effect is accomplished by forcing a draft of hot air, flue gas, or other drying gas suitably heated through the wet or moist catalyst after removal from the reaction chamber and sealing the reaction chamber from such draft.

While my invention is described herein more particularly as directed to the retention of a required superatmospheric pressure in the reactor as the catalyst is continuously withdrawn therefrom, it will be obvious, as the description progresses, that the invention is equally well adapted to prevent entrance of the external atmosphere to the reaction chamber when a reaction is carried out therein under vacuum conditions.

Fig. 1 of the drawings illustrates a form of my improved sealing apparatus designed for removal of the catalyst when the chemical reaction is occurring in the vapor phase. The lower portion of a reactor is indicated at R. At its lower end the reactor has a flanged outlet nozzle 1 for discharge of the spent catalyst therefrom. The catalyst removing and sealing apparatus is in receiving connection with this outlet nozzle and includes a conveyor unit having a receiving conduit defined by a straight tubular member, barrel, or the like 2 flanged at both ends and preferably horizontally disposed. One end of such conduit is closed by a head 3 having a stuffing box 4; adjacent to this end, the conduit has an upwardly projecting flanged inlet nozzle 5 in gas-tight connection with the reactor outlet nozzle 1. At the opposite end of this conduit there is a vertically arranged cylindrical casing 6 having oppositely projecting flanged nozzles 7 and 8 and a head 9 closing its upper end. The nozzle 7 is in gas-tight connection with the adjacent end of the conduit 2 and forms the outlet for said conduit. Within the conduit 2 there is rotatably mounted a screw conveyor 10 extending throughout the length of the conduit and having a pitch preferably diminishing progressively from the inlet to the outlet of the conduit. The shaft of the screw projects outwardly through the stuffing box 4 and has affixed to it a pulley 11, through which the necessary power to drive the shaft may be supplied from any suitable source (not shown). At a point intermediate its inlet and outlet and preferably nearer the inlet, the conduit 2 is provided with an upwardly extending flanged charging nozzle 12, the purpose of which will be explained hereinafter.

At the outlet of the conduit there is an outwardly opening conical valve or choke element 13 normally seated upon a beveled seat within the outlet. Fluid pressure means are provided to maintain this valve in closed position and include an air cylinder 14, which is closed at both ends, which is mounted upon the nozzle 8 of casing 6, and which has a piston 15 therein. A stem 16 for the valve 13 extends through a stuffing box 17 at the inner end of the air cylinder and is affixed to the piston. A pipe 18 connected to the cylinder 14 supplies the latter with air under pressure from a suitable source (not shown).

A casing 19 is spaced beneath the casing 6 and has an open upper end and a funnel-shaped lower end provided with a flanged discharge nozzle 20. An inclined spout 21 leads from one side of the casing; and, within the casing, there is a screen 22 inclined upwardly from the spout entrance. An electric vibrator V of any suitable well known type is mounted upon an outer side of the casing.

Screw conveyor units 23 and 24 are spaced beneath the spout 21 and the casing 19 and are arranged in endwise opposed relation to deliver in opposite directions. These conveyor units are, in general, similar to that previously described; and parts similar to those of said unit are designated by the same reference characters. Conveyor unit 23 is shown only in part; its purpose is to conduct the catalyst to the reactivation zone. Conveyor unit 24 has at its outlet a valve 13a, similar to the valve 13 of the first described unit and maintained in closed position by similar means including a piston 15a in an air cylinder 14a mounted in a casing 6a similar to the casing 6.

The casing 19 forms a separating chamber for the mixture of catalyst and filler material and is connected to the three conveyor units by three flexible unions 25 of the bellows expansion joint type. One of these unions makes a gas-tight connection between the lower end of casing 6 and the casing 19; another makes a gas-tight connection between the spout 21 and the inlet nozzle 5 of the conveyor unit 23; and the third makes a gas-tight connection between the discharge nozzle 20 of the casing 19 and the inlet nozzle 5 of conveyor unit 24. These flexible unions permit the casing 19 and its enclosed screen to be shaken by the electric vibrator V without any interference with the operation of the conveyor units.

A spout 26 is in gas-tight relation with the lower end of the casing 6a at the discharge end of the conveyor unit 24 and inclines downwardly from the latter. At its lower end the spout 26 is in gas-tight delivery connection with a conveyor line 28, which conveys the filler material, after separation from the catalyst, back to the conduit 2 for reuse. The conveyor line 28 comprises a gas-tight casing 29 enclosing a suitable conveyor means (not shown). Such conveyor means may comprise an endless link belt or chain provided with buckets or flights and trained over pulleys within the casing. The particular conveyor employed forms no part of the present invention, and it is considered unnecessary to illustrate it in detail. A pulley 30 is provided for driving the conveyor from any suitable power source (not shown). At its discharge end the conveyor line has a discharge spout 31 in gas-tight delivery connection with the charging nozzle 12 of the conduit 2 of the first conveyor unit. The pulleys 11 of the three screw conveyor units and the pulley 30 of the conveyor line 28 may be driven in unison from a common power source and through suitable power transmission belting (not shown).

The apparatus just described operates as follows to carry out my improved sealing method: A continuous stream of spent catalyst in granular form is delivered from the reactor R through the inlet nozzle 5 of the first conveyor unit and is continuously propelled along the conduit by the screw 10. As the stream passes the charging nozzle 12, it receives a continuous discharge of the finely divided filler material delivered by the conveyor line 28. The catalyst and the filler material are churned and mixed by the screw 10, and the mixture is advanced toward the conduit outlet and forced against the choke valve 13. This valve is constantly pressed toward the closed position by air pressure in the cylinder 14, so that passage through the conduit outlet is yieldably resisted. This resistance causes the propelling force of the screw to compact the mixture at the outlet and to form it into a dense mass to effectually seal the outlet against loss of pressure from the reaction chamber or against entrance of the external atmosphere if the reaction chamber is operated under vacuum. The diminishing pitch of the screw increases its compacting effect, and the air pressure in the cylinder 14 is regulated to offer the proper resistance to the opening of the valve 13. As the mixture passes continuously through the outlet, it drops upon the screen 22, which is continuously shaken by the vibrator V so that the granular catalyst is screened from the powdered filler material and is discharged through the spout 21 and into the conveyor unit 23 for delivery to the reactivation zone. The powdered filler material, on the other hand, passes through the screen and is delivered to the conveyor unit 24, the screw of which conveys the filler material along the unit and compacts it against the choke valve 13a, which is also operated under air pressure so that the compacted filler material seals the outlet of this conveyor unit. This seal prevents loss of pressure from the reactor through the conveyor line 28 and past the valve 13a. After passing the valve 13a, the filler material is discharged through the spout 26 to the continuously operating conveyor line 28. The latter returns it to the first conveyor unit for readmixture with further spent catalyst.

Fig. 2 shows a modification of the apparatus designed for removal of the catalyst when the reaction is carried out in the liquid phase. This modification provides for drying of the wet spent catalyst by a forced draft of a suitable drying gas before the filler material is admixed with it and also provides for sealing of the catalyst chamber from such draft. The modified apparatus is similar to the first-described form except that another screw conveyor unit 32 is added; this unit is interposed between the first conveyor unit and the casing 19, which defines the screening chamber. The filler material is introduced into this interposed unit instead of into the first unit, and provision is made for directing a forced draft of drying gas through the conduit of the interposed unit. At a point rearward of the charging nozzle 12a, the conduit 2 has a connection 33 for delivery thereto of hot air, flue gas, or other suitable drying gas under sufficient pressure from a suitable source (not shown). At a point located between the connection 33 and the catalyst inlet nozzle 5 of said conduit, there is another connection 34 leading from the opposite side of the conduit. The discharge end of the conduit is in gas-tight connection with a casing 6b similar to casing 6 and bearing an air-pressed valve 13b, piston 15b, and air cylinder 14b, all similar to the elements 13, 15, and 14, respectively. The inlet nozzle 5 of this unit receives the catalyst from the first conveyor unit through a gas-tight union 35 between said units.

The modified apparatus operates as follows: The spent catalyst in a wet or moist condition is conveyed from the reactor R by the first conveyor unit and compacted against the valve 13 by the screw 10. The catalyst next passes through the union 35 to the conveyor unit 32. As it is advanced by the screw of the latter unit, it is subjected to the forced drying draft entering through the connection 33 and flowing rearwardly through the conduit to the exhaust connection 34. Preferably the connections 33 and 34 are rather far apart along the conduit so as to obtain a long flow of the draft in a direction counter to that of the advance of the catalyst for adequate drying effect. The advancing catalyst, so dried, next is admixed with the filler material delivered through the charging nozzle 12a, and the two materials are mixed by the screw and compacted against valve 13b to form a seal in the manner previously described. After passing the valve 13b, the mixture is screened as previously described, the catalyst is delivered to the reactivation zone, and the filler material is delivered to the conveyor line 20 for return to the charging nozzle 12a. The seal afforded by the compacting of the wet catalyst against the valve 13 of the first conveyor unit prevents the gas of the drying draft from entering the reactor. The seal effected by the compacting of the mixture of catalyst and filler material against valve 13b prevents the loss of the drying gas, which is desirably introduced into conveyor unit 32 under a superatmospheric pressure.

It may be desirable in certain cases to employ the modified form of my apparatus as shown in Fig. 3. Parts of this modified apparatus similar to those of the unit shown in Fig. 1 are designated by the same reference characters. In this form the discharge conduit 2 in communication with the reactor R is arranged substantially vertically so that the compacting of the catalyst granules and the powdered filler material is assured. Sloping conduit 5a provides the necessary gas-tight connection between nozzle 1 of reactor R and conduit 2 for the discharge of the spent catalyst from reactor R. Screw conveyor 10 carries the granular catalyst downwardly past the charging nozzle 12, through which the desired powdered filler material is introduced for admixture with the catalyst granules. This mixture is then compacted by the screw 10 against the conical valve element 13, which yieldably resists the discharge of the compacted mixture from conduit 2 and thereby effects a pressure seal at the point of catalyst discharge from reactor R. The compacted mixture is discharged into a casing 6c, which is similar to casing 6 of Fig. 1 but which is desirably arranged horizontally and is provided with a downwardly sloping discharge nozzle 36. This latter nozzle is attached to a flexible expansion joint like that shown in Fig. 1, through which it is passed to a suitable screening or separating device for separate recovery of the catalyst and the filler material in accordance with the method previously described. It will be seen that this vertical arrangement insures an effective seal even in the case where the powdered filler material tends to separate from the catalyst granules because of gravity or for any other reason. This modified apparatus may also be employed in conjunction with a liquid phase catalytic operation. In such case conveyor unit 32 of Fig. 2 is desirably arranged vertically instead of horizontally, and discharge conduit 2 in direct communication with reactor R may also be so arranged.

My invention is applicable to any catalytic reaction in which a granular catalyst is employed. It is not necessarily limited to use in connection with a catalytic chemical reaction; it may also be utilized to seal a pressure or vacuum zone from which a granular contact material is being continuously removed. In particular, not only is my invention applicable to such hydrocarbon conversion reactions as catalytic cracking, polymerization, hydrogenation, and the like; but it is also applicable to hydrocarbon treating actions such as clay treating and catalytic desulfurization. The type of catalyst or contact material selected will, of course, depend on the particular reaction or treatment desired.

Particular conditions under which my invention may be successfully employed are as follows: The spent catalytic material continuously discharged from the reactor comprises granules of 30 to 40 mesh size. The pressure to be maintained within the reactor is between 20 to 30 lbs./in. The powdered filler material has approximately a 200 mesh size. It will be appreciated that successful operation depends on the proper selection of the size and amount of the filler material as compared to the size and amount of the granular catalyst so that an effective seal can be obtained. It is also to be noted that, where the operating temperatures are much above atmospheric, the sealing apparatus will be suitably lagged.

While I have disclosed several satisfactory forms of embodiment of my invention, the invention is not to be limited to these specific embodiments and the details disclosed but includes within its scope such changes as come within the spirit of the appended claims.

I claim:

1. The method of continuously removing a granular contact material from an enclosed zone operated under a pressure other than atmospheric, comprising continuously conducting the contact material from said zone into a gas-tight discharge conduit having an outlet, continuously introducing into said conduit a solid filler material more finely divided than the contact material, continuously mixing the contact material and filler material within the conduit, propelling the mixture continuously along the conduit and through the conduit outlet, and choking said outlet whereby the propelling force will compact the mixture against the choke and seal the outlet gas-tight.

2. The method as claimed in claim 1, wherein a granular catalyst is continuously removed from a reaction chamber.

3. The method of continuously removing catalyst in granular form from a reaction chamber operated under a pressure other than atmospheric, comprising continuously conducting the catalyst from said chamber into a gas-tight discharge conduit having an outlet, continuously introducing into said conduit a solid filler material more finely divided than the catalyst, continuously mixing the catalyst and filler material within the conduit, propelling the mixture continuously along the conduit and through the conduit outlet, choking said outlet whereby the propelling force will compact the mixture against the choke and seal the outlet gas-tight, and separating the catalyst and filler material after discharge of the mixture through said outlet.

4. The method of continuously removing spent catalyst in granular form from a reaction chamber operated under a pressure other than atmospheric, comprising continuously conducting the catalyst from said chamber into a gas-tight discharge conduit having an outlet, continuously introducing into said conduit a solid filler material more finely divided than the catalyst, continuously mixing the catalyst and filler material within the conduit, propelling the mixture continuously along the conduit and through the conduit outlet, choking said outlet, whereby the propelling force will compact the mixture against the choke and seal the outlet gas-tight, separating the catalyst and filler material after discharge of the mixture through said outlet, and continuously delivering the separated filler material back to said conduit for reuse.

5. The method as claimed in claim 4, which includes passing the discharged mixture of granular catalyst and powdered filler material through a screen and separating the granular catalyst from the powdered filler material by screening.

6. The method of removing a granular catalyst from a reaction chamber wherein the reaction is conducted in liquid phase under a pressure other than atmospheric, comprising conducting the wet catalyst from said chamber into a gas-tight discharge conduit having an outlet, directing a forced draft of drying gas through the introduced wet catalyst to dry it, introducing into said conduit a solid filler material more finely divided than the catalyst, mixing the dried catalyst and filler material within the conduit, propelling the mixture along the conduit and through said outlet, and choking said outlet whereby the propelling force will compact the mixture against the choke and seal the outlet gas-tight.

7. The method of removing spent catalyst in granular form from a reaction chamber wherein the reaction is conducted in liquid phase under a pressure other than atmospheric, comprising conducting the wet catalyst from said chamber in a continuous stream into a gas-tight discharge conduit having an outlet, directing a forced draft of drying gas through the introduced wet catalyst to dry it, compacting the wet catalyst at a point in said stream to form a seal to exclude said draft from the reaction chamber, continuously admixing with the dried catalyst in the conduit a solid filler material more finely divided than the catalyst, continuously mixing the catalyst and filler material within the conduit, continuously propelling the mixture along the conduit and through said outlet, and choking said outlet whereby the propelling force will compact the mixture against the choke and seal the outlet gas-tight.

8. Apparatus for removing contact material in granular form from an enclosed chamber maintained at a pressure other than atmospheric, comprising a gas-tight conduit having an inlet to receive the contact material from the chamber, an outlet spaced along the conduit from said inlet, and an inlet to admit to the conduit a solid filler material more finely divided than the contact material, choke means to yieldably resist passage of the contact material through said outlet, and means operable to mix the catalyst and filler material continuously within the conduit and to propel the mixture continuously along the conduit and through said outlet and to compact the mixture against said choke means to form a gas-tight seal at the outlet.

9. Apparatus for removing catalyst in granular form from a reaction chamber operated at a pressure other than atmospheric, comprising a gas-tight conduit having an inlet to receive the catalyst from the reaction chamber, an outlet spaced along the conduit from said inlet, and an inlet to admit to the conduit a solid filler material more finely divided than the catalyst, choke means to yieldably resist passage of the catalyst through said outlet, means operable to mix the catalyst and filler material continuously within the conduit and to propel the mixture continuously along the conduit and through said outlet and to compact the mixture against said choke means to form a gas-tight seal at the outlet, and means to separate the catalyst and filler material continuously after discharge through said outlet.

10. The apparatus as claimed in claim 9, which includes means to deliver the separated filler material continuously to the filler material inlet of the conduit.

11. Apparatus for removing spent catalyst in granular form from a reaction chamber operated at a pressure other than atmspheric, comprising a gas-tight conduit having an inlet to receive the catalyst from the reaction chamber, an outlet spaced along the conduit from said inlet, and an inlet to admit to the conduit a solid filler material more finely divided than the catalyst, choke means to yieldably resist passage of the catalyst through said outlet, means operable to mix the catalyst and filler material continuously within the conduit and to propel the mixture continuously along the conduit and through said outlet and to compact the mixture against said choke means to form a gas-tight seal at the outlet, means to separate the catalyst and filler material continuously after discharge through said outlet, means to deliver the separated filler material continuously to the filler material inlet of the conduit, and means to compact the filler material at a point in its passage from the separating point to the conduit to form another gas-tight seal, for the purpose set forth.

12. Apparatus for removing spent catalyst in granular form from a reaction chamber wherein the reaction is conducted in liquid phase under a pressure other than atmospheric, comprising a gas-tight conduit having an inlet to receive the wet catalyst in a continuous stream from the reaction chamber, an outlet spaced along the conduit from said inlet, and an inlet to admit to the conduit a solid filler material more finely divided than the catalyst, means to direct a forced draft of drying gas through the introduced wet catalyst to dry it before it receives said filler material, means to compact the wet catalyst at a point in said stream to form a seal for excluding said draft of drying gas from the reaction chamber, choke means to yieldably resist passage of the dried catalyst through said outlet, and means operable to mix the dried catalyst and filler material continuously within the conduit and to propel the mixture continuously along the conduit and through said outlet and to compact the mixture against said choke means to form a gas-tight seal at the outlet.

13. Apparatus for removing spent catalyst in granular form from a reaction chamber wherein the reaction is conducted in liquid phase under a pressure other than atmospheric, comprising a gas-tight conduit having an inlet to receive the wet catalyst in a continuous stream from the reaction chamber, an outlet spaced along the conduit from said inlet, and an inlet to admit to the conduit a solid filler material more finely divided than the catalyst, means to direct a forced draft of drying gas through the introduced wet catalyst to dry it before it receives said filler material, means to compact the wet catalyst at a point in said stream to form a seal for excluding said draft of drying gas from the reaction chamber, choke means to yieldably resist passage of the dried catalyst through said outlet, means operable to mix the dried catalyst and filler material continuously within the conduit and to propel the mixture continuously along the conduit and through said outlet and to compact the mixture against said choke means to form a gas-tight seal at the outlet, means to separate the catalyst and filler material continuously after discharge through said outlet, means to deliver the separated filler material continuously to the filler material inlet of the conduit, and means to compact the filler material at a point in its passage from the separation point to the conduit to form a gas-tight seal, for the purpose set forth.

14. The apparatus as claimed in claim 9, wherein the means to separate the catalyst and filler material after discharge through said outlet comprises a screen and means to vibrate the screen.

15. The apparatus as claimed in claim 9, wherein the gas-tight conduit is arranged substantially horizontally.

16. The apparatus as claimed in claim 9, wherein the gas-tight conduit is arranged substantially vertically.

17. The apparatus as claimed in claim 9, wherein the means to mix the catalyst and filler material and to propel the mixture along the conduit comprises a screw conveyor, the pitch of which gradually diminishes as the outlet of the conduit is approached.

18. The method as claimed in claim 4, which includes compacting the separated filler material at a point in its passage from the separation point to the conduit to form a gas-tight seal for the purpose set forth.

19. The method as claimed in claim 7, which includes continuously separating the dried catalyst and the filler material after discharge of the mixture thereof through the outlet.

20. The method as claimed in claim 7, which includes continuously separating the mixture of dried catalyst and filler material after discharge thereof through the outlet by screening and continuously returning the separated filler material to the conduit for reuse.

HYMAN R. DAVIS.